US010059041B2

(12) United States Patent
Heath et al.

(10) Patent No.: US 10,059,041 B2
(45) Date of Patent: Aug. 28, 2018

(54) MULTI-STATE BLADDER FOR MANUFACTURE OF COMPOSITE MATERIAL

(71) Applicant: The Boeing Company, Chicago, IL (US)

(72) Inventors: Edward Heath, Mount Pleasant, SC (US); Andrew Elmer Modin, Charleston, SC (US); Paul D. Shaw, Charleston, SC (US); Raviendra Suriyaarachchi, Charleston, SC (US)

(73) Assignee: The Boeing Company, Chicago, IL (US)

( * ) Notice: Subject to any disclaimer, the term of this patent is extended or adjusted under 35 U.S.C. 154(b) by 307 days.

(21) Appl. No.: 14/822,247

(22) Filed: Aug. 10, 2015

(65) Prior Publication Data

US 2017/0043510 A1 Feb. 16, 2017

(51) Int. Cl.
| | | |
|---|---|---|
| *B29C 43/10* | (2006.01) | |
| *B29C 33/48* | (2006.01) | |
| *B29L 22/00* | (2006.01) | |
| *B29C 33/50* | (2006.01) | |
| *B29K 105/08* | (2006.01) | |
| *B29C 70/44* | (2006.01) | |

(52) U.S. Cl.
CPC ............ *B29C 33/485* (2013.01); *B29C 33/50* (2013.01); *B29C 70/446* (2013.01); *B29K 2105/08* (2013.01); *B29L 2022/00* (2013.01)

(58) Field of Classification Search
None
See application file for complete search history.

(56) References Cited

U.S. PATENT DOCUMENTS

| | | | | |
|---|---|---|---|---|
| 2,359,471 A | * | 10/1944 | Ewing | .................. B28B 7/30 249/115 |
| 2,503,431 A | * | 4/1950 | Bender | .................. B21D 53/78 219/137 R |
| 3,177,105 A | * | 4/1965 | Wiltshire | .............. B29C 53/566 156/218 |
| 3,425,642 A | | 2/1969 | May | |
| 3,476,351 A | * | 11/1969 | Burdett | .................... B28B 7/30 249/181 |
| 5,366,684 A | | 11/1994 | Corneau, Jr. | |
| 7,357,166 B2 | | 4/2008 | Pham et al. | |
| 7,530,530 B2 | | 5/2009 | Engwall et al. | |
| 8,293,051 B2 | | 10/2012 | Morris et al. | |
| 8,430,984 B2 | | 4/2013 | Lee et al. | |
| 8,800,953 B2 | | 8/2014 | Morris et al. | |
| 8,945,325 B2 | | 2/2015 | Everhart et al. | |
| 8,974,217 B2 | | 3/2015 | Everhart et al. | |

* cited by examiner

*Primary Examiner* — Matthew J Daniels
*Assistant Examiner* — Mohammad M Ameen
(74) *Attorney, Agent, or Firm* — McDonnell Boehnen Hulbert & Berghoff LLP (57) ABSTRACT

Within examples, methods and systems for a multi-state bladder or elastomeric apparatus for manufacture of composite material are provided. The elastomeric apparatus includes a housing having a flexible surface state and a rigid surface state, a rod within the housing extending along a length of the housing, and a plurality of components mounted to the rod, such that in an engaged position of the rod the plurality of components cause the housing to have the rigid surface state, and in a disengaged position of the rod the plurality of components enable the housing to have the flexible surface state.

14 Claims, 10 Drawing Sheets

MULTI-STATE BLADDER FOR MANUFACTURE OF COMPOSITE MATERIAL

FIELD

The present disclosure generally relates to methods and equipment for fabricating composite resin parts, and more particularly to a bladder system used in curing composite parts.

BACKGROUND

Composite parts, such as those used in the manufacture of aircraft, can be constructed using various production methods, such as filament winding, tape placement, overbraid, chop fiber roving, coating, hand lay-up, or other composite processing techniques and curing processes. Most of these processes use a rigid cure tool/mandrel on which composite material is applied and then cured into a rigid composite part. For example, automated fiber placement (AFP) machines may be used to place fiber reinforcements on molds or mandrels to form composite layups. Following, composite parts may be cured within an autoclave that applies heat and pressure to the part during a cure cycle.

Some composite part geometries include internal cavities that may cause the part to collapse under application of composite material or autoclave pressure unless a tool such as an inflatable bladder is placed in the cavity. Such an inflatable bladder may be inflated during a cure process so as to react the autoclave pressure force applied to the part. Typically, these inflatable bladders are pressurized by venting them to the autoclave pressure through a vacuum bag.

However, during the automated fiber placement of the composite materials, the AFP machines exert pressure on the mold and bladder. Thus, existing inflatable bladders used in fabrication of composite material layups to inflate and provide even pressure during the cure cycle often deform due to the exerted pressure, which can impact laminate quality. Other solutions that use stiff bladders to maintain the internal cavity shape during the curing process typically only give a small improvement in deformation during fiber placement, but may not perform as well during the cure cycle.

Still other types of bladders have other drawbacks. Removable rigid bladder inserts can be used, but this requires a secondary installation and removal operation requiring additional labor and time. Solid mandrels can be used in place of bladders to provide resistance to deformation during fiber placement, but such mandrels are heavy and often do not provide even pressure during the cure cycle that reduces part quality. Shape memory polymers can also be used to change a state of bladder stiffness, however, this type of bladder is also typically heavier and very complex to design. Accordingly, there is a need for a bladder design that will allow the bladder to be rigid for automated fiber placement improving part quality, and also allow the bladder to be flexible during the curing cycle.

SUMMARY

In one example, an elastomeric apparatus for use in manufacture of a composite component is described. The elastomeric apparatus comprises a housing having a flexible surface state and a rigid surface state, a rod within the housing extending along a length of the housing, and a plurality of components mounted to the rod, such that in an engaged position of the rod the plurality of components cause the housing to have the rigid surface state, and in a disengaged position of the rod the plurality of components enable the housing to have the flexible surface state.

In another example, an elastomeric apparatus comprises a housing having a flexible surface state and a rigid surface state, a plurality of pairs of surface components provided on opposing internal surfaces of the housing, and a pair of surface components comprises a first surface component provided on a first internal surface of the housing and a second surface component provided on a second internal surface of the housing that is opposite the first internal surface. The elastomeric apparatus also comprises a plurality of spaces between the plurality of pairs of surface components, a rod within the housing extending along a length of the housing, and a plurality of components mounted to the rod, such that in an engaged position of the rod the plurality of components are aligned with respective pairs of the plurality of pairs of surface components to cause the housing to have the rigid surface state, and in a disengaged position of the rod the plurality of components are aligned with respective spaces of the plurality of spaces to cause the housing to have the flexible surface state.

In still another example, a method for altering a surface rigidity of an elastomeric apparatus is described. The method comprises providing a housing of the elastomeric apparatus having a first surface state and a second surface state, and the housing has a rod within the housing extending along a length of the housing and a plurality of components mounted to the rod. The method also comprises actuating the rod in a first direction to change a surface rigidity state of the housing, such that the housing has the first surface state, and actuating the rod in a second direction to change the surface rigidity state of the housing, such that the housing has the second surface state.

The features, functions, and advantages that have been discussed can be achieved independently in various embodiments or may be combined in yet other embodiments further details of which can be seen with reference to the following description and drawings.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings, wherein:

DETAILED DESCRIPTION

Disclosed embodiments will now be described more fully hereinafter with reference to the accompanying drawings, in which some, but not all of the disclosed embodiments are shown. Indeed, several different embodiments may be described and should not be construed as limited to the embodiments set forth herein. Rather, these embodiments are described so that this disclosure will be thorough and complete and will fully convey the scope of the disclosure to those skilled in the art.

Within examples, methods and apparatus for providing structural support to a mold or mandrel, such as for shaping a composite part, are described. A support apparatus may comprise a bladder capable of multiple states including a first state that is a soft and/or flexible state, and a second state that is a rigid and/or stiff state. The bladder changes from the soft state to the rigid state by actuation of a mechanical actuator. Thus, the bladder may be placed in the rigid state during curing of the composite material on the mandrel, and after a cure cycle, the bladder may be placed in the soft state to provide clearance to be removed from the cured composite part.

In some examples, depending on specific manufacturing uses, a natural state of the bladder might be normally rigid and activated to be flexible or soft, or normally flexible or soft and activated to be rigid.

Thus, a flexible bladder can be used in fabrication of composite material layups to inflate and provide even pressure during the cure cycle. Further, during automated lamination of composite materials, such as with automated fiber placement (AFP) process, the automated equipment exerts pressure on the bladder which can cause the bladder to deform and result in excess material being placed. However, use of the multi-state bladder will allow the bladder to be rigid during lamination so as to improve part quality and also allow the bladder to be flexible during the curing cycle. For example, it may be desirable to have the ability for the bladder to become rigid during a short period of time when AFP equipment is pressing on the bladder enables the composite material to be applied more efficiently without adding steps to the manufacturing process.

Figure 1:
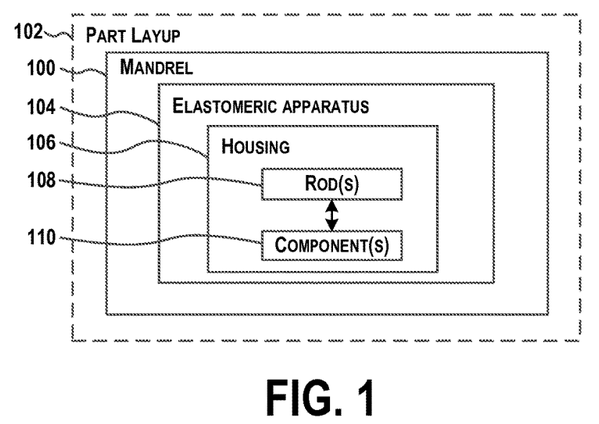
FIG. 1 illustrates an example system including a mandrel be used to form and/or cure a part layup comprising multiple plies of fiber reinforced polymer resin, according to an example embodiment.

Referring now to FIG. 1, a mandrel 100 may be used to form and/or cure a part layup 102 comprising multiple plies (not shown) of fiber reinforced polymer resin. For example, multiple plies of fiber reinforced polymer plies are laid up over the mandrel 100 in order to form the plies into a desired part shape. The part layup 102 may partially or fully surround the mandrel 100, such that the mandrel 100 is at least substantially enclosed by the part layup 102. The mandrel 100 includes a flexible elastomeric apparatus 104 having a flexible housing 106 forming an enclosure that may collapse inwardly when the flexible elastomeric apparatus 104 is placed into a flexible state to allow the mandrel 100 to be withdrawn from the part layup 102 either after the layup is compacted and/or cured. The housing 106 has a flexible surface state and a rigid surface state. The flexible elastomeric apparatus 104 further includes a rod 108 within the housing 106 and extending along a length of the housing 106, as well as a plurality of components 110 mounted to the rod 108. In an engaged position of the rod 108, the plurality of components 110 cause the housing 106 to have the rigid surface state, and in a disengaged position of the rod 108 the plurality of components 110 enable the housing 106 to have the flexible surface state. Thus, the components 110 can be configured to restrain the flexible elastomeric apparatus 104 against deformation as the part layup 102 is applied when the rod 108 is in the engaged position.

The elastomeric apparatus 104 may be a bladder or other structural component for curing the part layup 102. To enable flexibility of the elastomeric apparatus 104, the housing 106 has a flexible surface state and a rigid surface state based on positioning of the rod 108 and the components 110 in the housing 106.

The components 110 may be support structures composed of any number of materials, including steal, plastic, etc. arranged within the housing 106 in a predetermined manner. The components 110 may be structures that are disposed within, but are separate from the housing 106.

The part layup 102 may be cured to form any of a variety of composite components, structures, or parts that form full or partial enclosures having uniform or non-uniform cross sections along their lengths. For example, the cured part may comprise a duct (not shown) or a conduit (not shown) used to transport fluids, such as, for example and without limitation, air ducts and fuel lines used in a wide variety of applications, including vehicles. An example of a composite component that may benefit from use of the mandrel 100 and flexible elastomeric apparatus 104 to form the part layup 102 is illustrated in FIG. 2.

Figure 2:
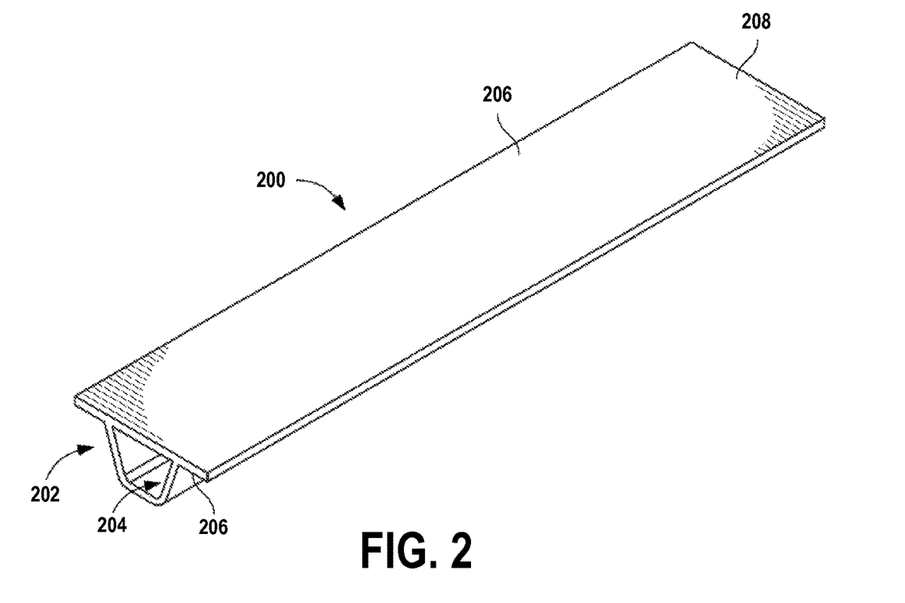
FIG. 2 illustrates an example of a composite component that may benefit from use of the mandrel and flexible elastomeric apparatus to form the part layup as described in FIG. 1, according to an example embodiment.

In FIG. 2, the disclosed flexible apparatus and curing method may be employed to cure a variety of composite resin parts of various geometries, having one or more internal cavities. For example, and without limitation, the disclosed flexible bladder and curing method may be used in fabrication of a fiber reinforced composite resin stringer 200. In one arrangement, the stringer 200 may comprise a multi-ply layup of prepreg. In the illustrated arrangement, the stringer 200 comprises a hat section 202 forming an internal stringer cavity 204, a pair of laterally extending flange sections 206, and a substantially flat skin section 208 that is consolidated together with the flange sections 206 during curing. As those of ordinary skill in the art will recognize, alternative stringer geometries are possible.

The stringer 200 may be fabricated using the mandrel 100 and flexible elastomeric apparatus 104 in FIG. 1 by applying the part layup 102 to the mandrel 100 with the flexible elastomeric apparatus 104 inserted into the mandrel 100. After curing, the part layup 102 forms the stringer 200. The flexible elastomeric apparatus 104 fills the stringer cavity 204 that is a hollow trapezoidal space or opening. The flexible elastomeric apparatus 104 functions to react a force of a lamination head during application of the part layup 102, and so the flexible elastomeric apparatus 104 may be rigid to react to loads during skin lamination, and flexible to be removed after cure.

In another embodiment, the stringer 200 is preformed and is uncured. The mandrel 100 is positioned within the stringer cavity 204 and has a shape that substantially conforms to the corresponding stringer cavity 204 such that the mandrel 100 and internal flexible elastomeric apparatus 104 may provide support to the stringer 200 during curing. The mandrel 100 of the illustrated embodiment has a trapezoidal shape to conform to a hat-shaped stringer 200, although the mandrel could have any number of other shapes to conform to differently shaped stringers.

The mandrel 100 may be formed of any elastomeric material, such as Teflon® (E.I. du Pont de Nemours and Company) coated silicone or hard rubber, and may be pliable to enable the mandrel 100 to conform to various configurations. The elastomeric apparatus 104 may be formed, for example and without limitation, from flexible silicon rubber, and the housing 106 may be an elastomer housing.

Example composite material used for the stringer 200 may be generally a lightweight material, such as an uncured pre-impregnated reinforcing tape or fabric (i.e., "prepreg"). The tape or fabric can include a plurality of fibers such as graphite fibers that are embedded within a matrix material, such as a polymer, e.g., an epoxy or phenolic. The tape or fabric could be unidirectional or woven depending on a degree of reinforcement desired. Thus, the prepreg tape or fabric is laid onto the mandrel 100 (or mold) to pre-form the tape or fabric into a desired shape of the stringer 200 as defined by the mandrel 100. The stringer 200 could be any suitable dimension to provide various degrees of reinforcement, and could comprise any number of plies of prepreg tape or fabric.

Figure 3:
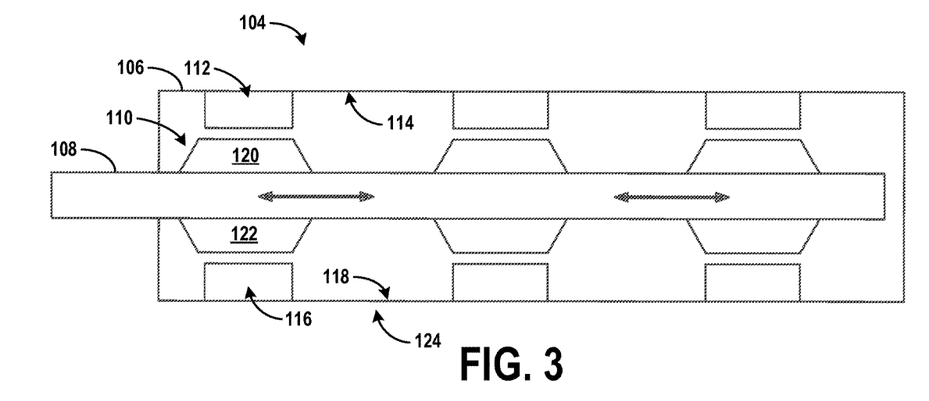
FIG. 3 illustrates an example of the elastomeric apparatus with the rod in an engaged position, according to an example embodiment.
Figure 4:
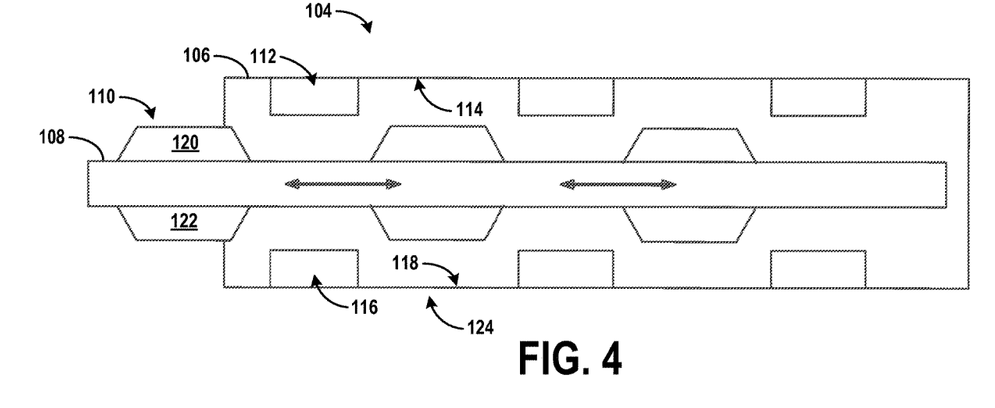
FIG. 4 illustrates an example of the elastomeric apparatus with the rod in a disengaged position, according to an example embodiment.

FIG. 3 illustrates an example of the elastomeric apparatus 104 with the rod 108 in an engaged position, and FIG. 4 illustrates an example of the elastomeric apparatus 104 with the rod in a disengaged position. The components 110 are mounted to the rod 108 spaced apart along a length of the rod 108. Three components are shown in FIG. 3, although more or fewer components may be included depending on a design and application of the elastomeric apparatus 104.

The elastomeric apparatus 104 also includes a plurality of pairs of surface components provided on opposing internal surfaces of the housing 106. A pair of surface components comprises a first surface component 112 provided on a first internal surface 114 of the housing 106 and a second surface component 116 provided on a second internal surface 118 of the housing 106 that is opposite or across from the first internal surface 114. The rod 108 is configured to be actuated in a linear manner so as to transition between an engaged position (as shown in FIG. 3) and a disengaged position (as shown in FIG. 4) through a linear actuation.

The surface components 112 and 116 may comprise the same material as the component 110 and may be of about the same size and shape, or may have a same surface area as a surface area of the component 110 so that the component 110 may align with the surface components 112 and 116.

Within examples, in the engaged position of the rod as shown in FIG. 3, the components 110 are aligned with respective pairs of the plurality of pairs of surface components 112 and 116 to cause the housing 106 to have a rigid surface state. For example, the components 110 comprise an upper component 120 for contact with the first surface component 112 provided on the first internal surface 114 of the housing 106 and a lower component 122 for contact with the second surface component 116 provided on the second internal surface 118 of the housing 106. When the rod 108 is in the engaged position, the components 110 substantially line up or align with the surface components 112 and 116. Substantial alignment may allow for deviations or variations, including for example, tolerances, measurement error, measurement accuracy limitations and other factors known to skill in the art, that may occur in amounts that do not preclude sufficient alignment of the component 110 and the surface components 112 and 116, for example, to enable internal structure of the elastomeric apparatus for the rigid surface state of the housing 106.

Furthermore, as used herein, by the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The elastomeric apparatus 104 also includes a plurality of spaces, such as space 124, between the plurality of pairs of surface components. As shown in FIG. 4, when the rod 108 is in a disengaged position, the components 110 are aligned with respective spaces of the plurality of spaces to cause the housing 106 to have the flexible surface state.

Thus, in operation, the rod 108 is configured to transition between the engaged position and the disengaged position through a bi-directional linear actuation causing the plurality of components 110 to be aligned with respective pairs of the plurality of pairs of surface components 112 and 116 through actuation in a first direction (e.g., to the right as shown in FIG. 3) and to be aligned with respective spaces of the plurality of spaces through actuation in a second direction (e.g., to the left as shown in FIG. 4). The rod 108 thus shifts back and forth a distance about equivalent to the distance of the space 124, which may be about 1-1.5 inches, depending on a size of the elastomeric apparatus 104.

FIGS. 3 and 4 illustrate portions of the elastomeric apparatus 104 including three components. Any number of components and associated surface components and spaces may be included based on a shape and size of the elastomeric apparatus 104.

Figure 5:
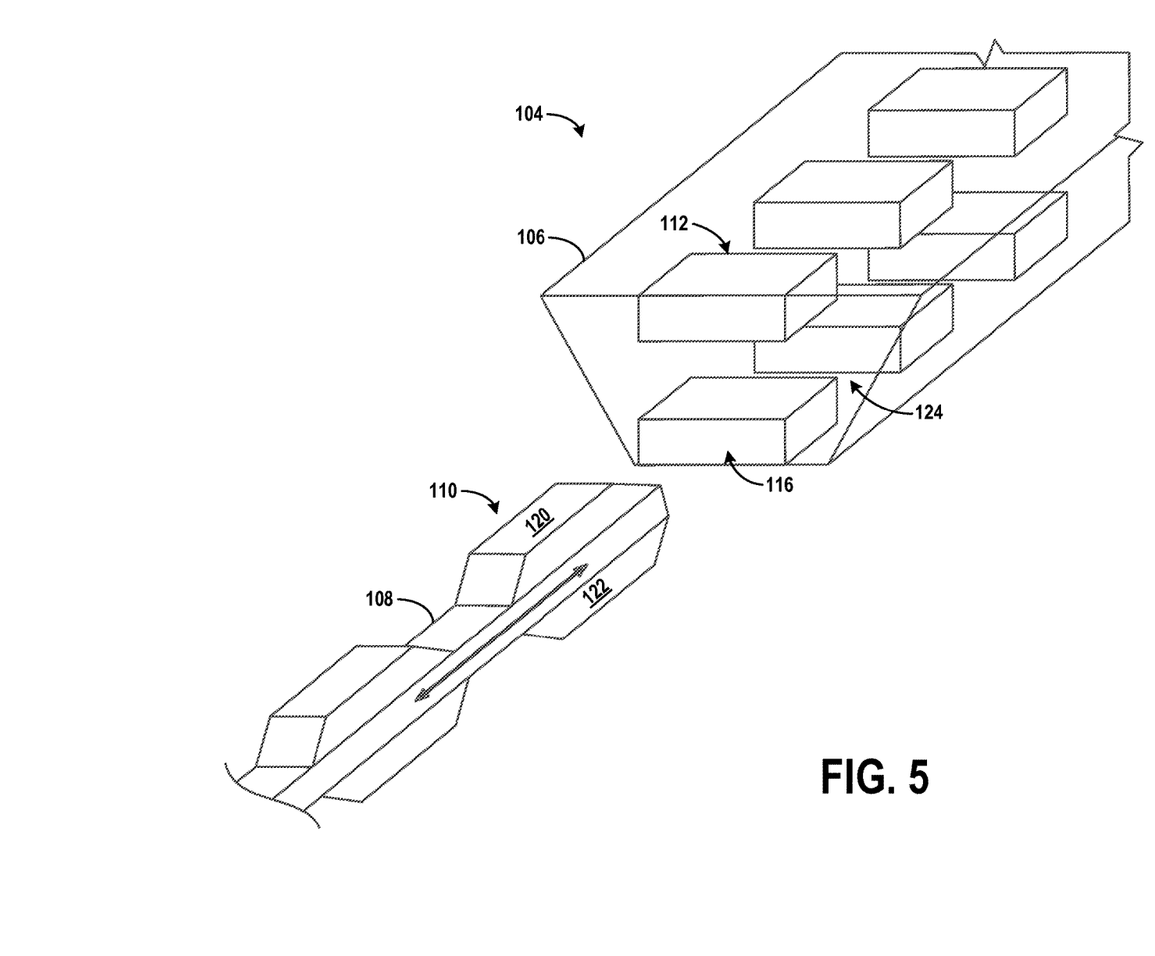
FIG. 5 illustrates another view of the elastomeric apparatus and the rod with components attached being inserted into the housing to be in the engaged positioned, according to an example embodiment.

FIG. 5 illustrates another view of the elastomeric apparatus 104 and the rod 108 with components 110 attached being inserted into the housing 106 to be in the engaged positioned. In FIG. 5, the housing 106 is shown as a trapezoidal shape. In other examples, the housing 106 may have a rounded hat shape, or still other shapes of the housing 106 are possible depending on application of the elastomeric apparatus 104.

Figure 6:
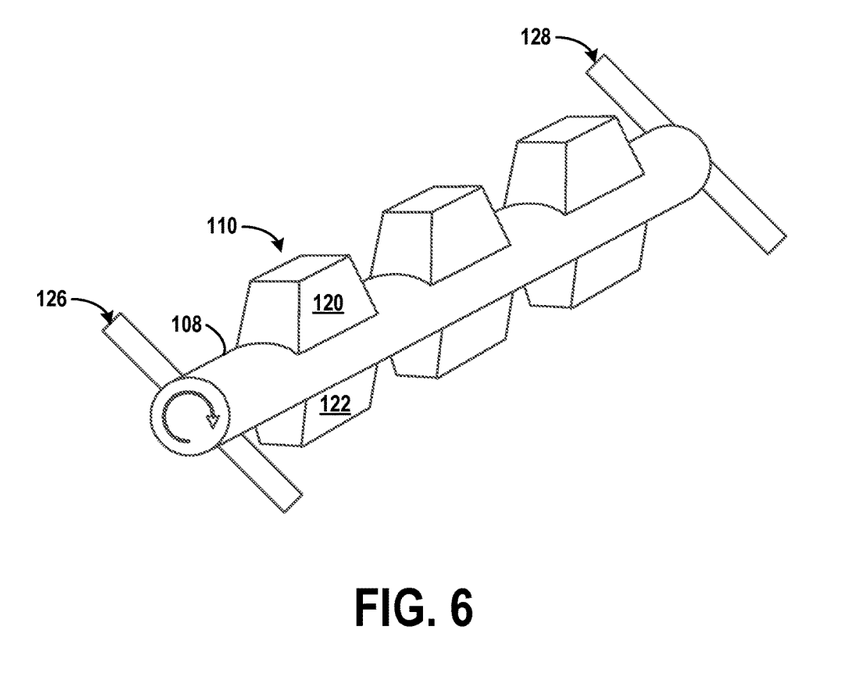
FIG. 6 illustrates an example of the rod being actuated in a rotational manner, according to an example embodiment.

FIG. 6 illustrates an example of the rod 108 being actuated in another manner, according to an example embodiment. In FIG. 6, the rod 108 is shown to be configured to transition between the engaged position and the disengaged position through a rotational actuation. In this example, the upper component 120 and the lower component 122 contact the pairs of surface components 112 and 116 (not shown in FIG. 6) in the engaged position of the rod 108 with the lower component 122 and the upper component 120 being vertically aligned. In the disengaged position of the rod 108, the upper component 120 and the lower component 122 do not contact the pairs of surface components 112 and 116 (not shown in FIG. 6) with the lower component 122 and the upper component 120 being in an approximate horizontal position (not shown). In this manner, in the disengaged position, the rod 108 rotates to disengage the upper component 120 and the lower component 122 from contact with the pairs of surface components 112 and 116.

In FIG. 6, the rod 108 is shown coupled to links 126 and 128. The rod 108 extends along a center of the housing 106 and couples to walls of the housing 106 via the links 126 and 128. The rod 106 may thus be stationary along a horizontal plane within the housing 106, and capable of rotating along a rotational axis as shown.

Thus, whether through linear or rotational actuation, in the engaged position of the rod 108, as shown in FIG. 3, the housing 106 will have internal support and be rigid due to the component 110 contacting the pairs of surface components 112 and 116. In the disengaged position of the rod 108, as shown in FIG. 4, the housing 106 will not have the same internal support and will be flexible due to the component 110 not contacting the pairs of surface components 112 and 116.

Figure 7:
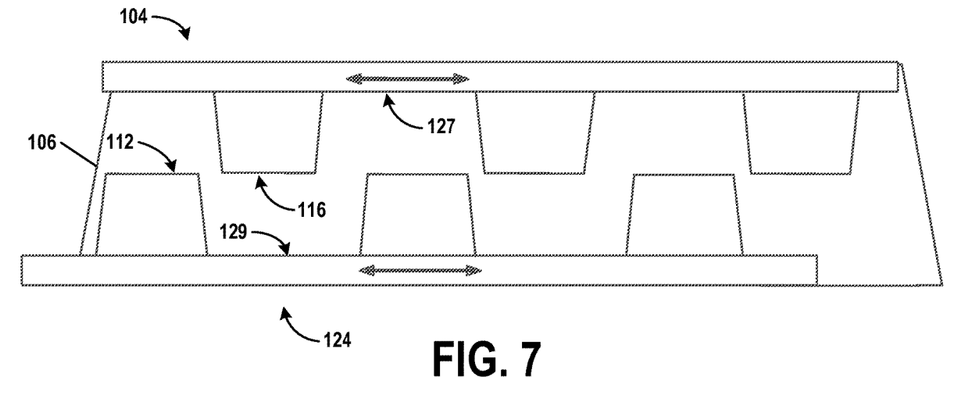
FIG. 7 illustrates another example of the elastomeric apparatus in a flexible state, according to another example embodiment.
Figure 8:
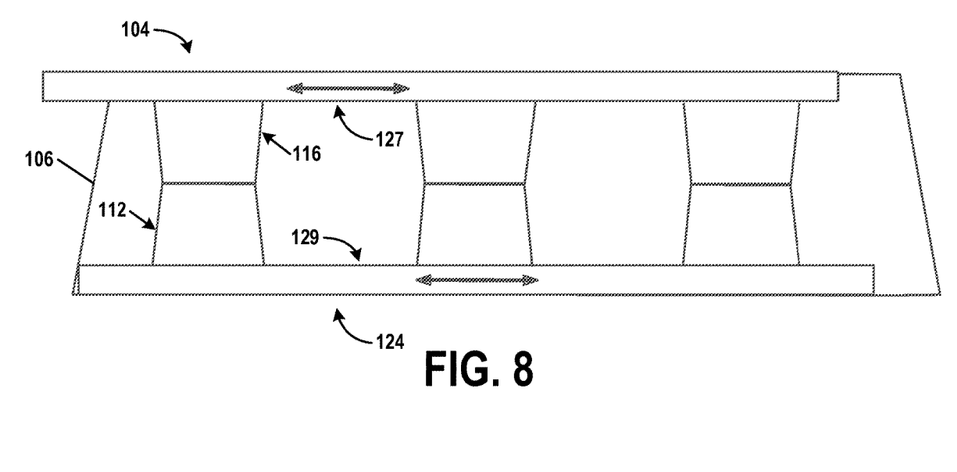
FIG. 8 illustrates another example of the elastomeric apparatus in a rigid state, according to another example embodiment.

FIGS. 7 and 8 illustrate another example of the elastomeric apparatus 104, according to another example embodiment. FIG. 7 illustrates the elastomeric apparatus 104 in the flexible state, and FIG. 8 illustrates the elastomeric apparatus 104 in the rigid state. The rod 106 and the components 110 are removed. Here, rather, rods 127 and 129 are provided for moving the surface components 112 and 116 in a linear or rotational manner. In this way, there can be two independent cam movements, and the entire cam system can be removed from the elastomeric apparatus 104. Each of the rods 127 and 129 may be moveable or actuated (or one rod may be fixed and the other movable) so as to transition a surface rigidity state of the housing 106 from the flexible surface state to the rigid surface state, or from the rigid surface state to the flexible surface state.

Figure 9:
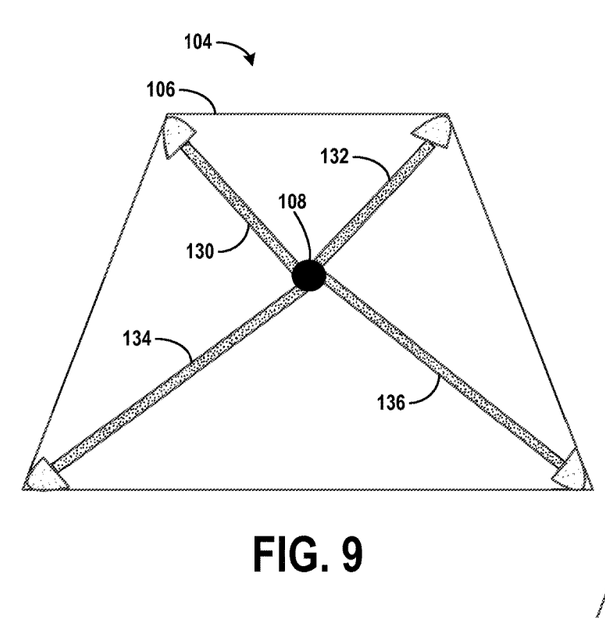
FIG. 9 illustrates an end view of another example of the elastomeric apparatus with the rod in the engaged position, according to another example embodiment.
Figure 10:
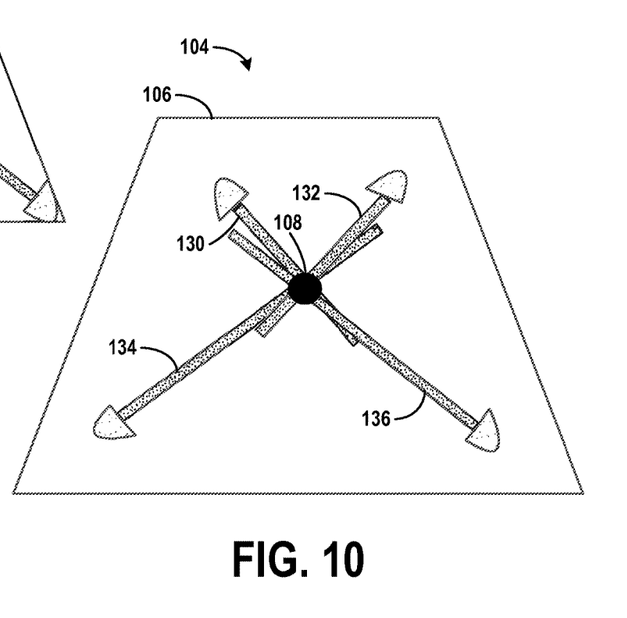
FIG. 10 illustrates an end view of another example of the elastomeric apparatus with the rod in the disengaged position, according to another example embodiment.

FIGS. 9 and 10 illustrate another example of the elastomeric apparatus 104, according to another example embodiment. FIGS. 9 and 10 illustrate end views of the elastomeric apparatus 104. In FIG. 9, the elastomeric apparatus 104 includes components in a form of struts 130, 132, 134, and 136 hingedly mounted to the rod 108 and extendable to internal walls of the housing 106. FIG. 9 illustrates an end view of the rod 108 in the engaged position, such that the struts 130, 132, 134, and 136 are expanded to provide the rigid surface state. FIG. 10 illustrates the disengaged position of the rod 108, such that the struts 130, 132, 134, and 136 collapse to provide the flexible surface state.

In one example, the struts 130, 132, 134, and 136 are hingedly mounted to the rod 108 and extend to corners of the housing 106, as shown in FIG. 9, such that in the engaged position of the rod 108, the struts 130, 132, 134, and 136 expand to provide a radial rigid surface state of the housing 106. The struts 130, 132, 134, and 136 may alternatively extend to other areas of the internal surfaces of the housing 106 to provide rigid structure points across a surface area of the housing 106.

Figure 11:
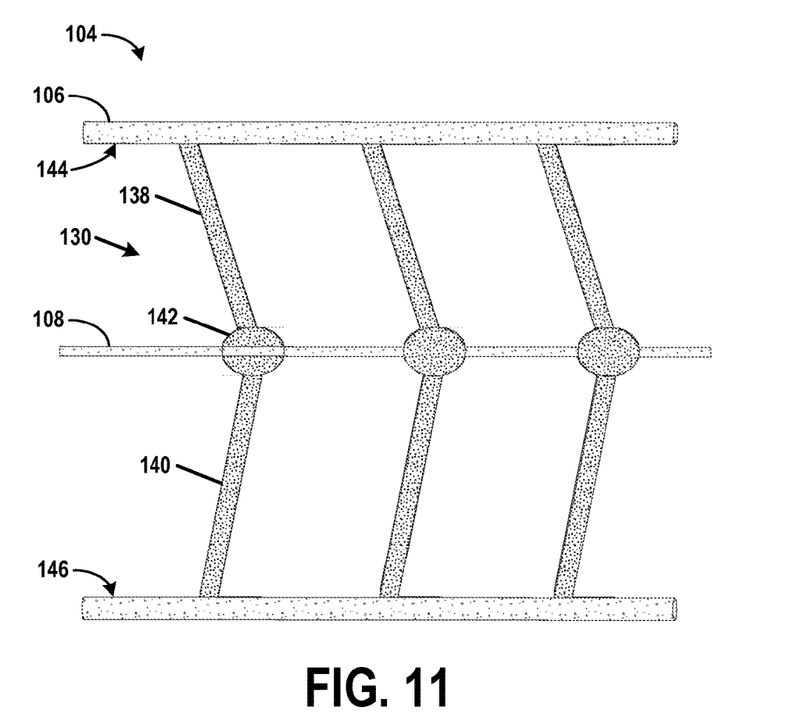
FIG. 11 illustrates a side view of the elastomeric apparatus with the rod in the engaged position, according to another example embodiment.
Figure 12:
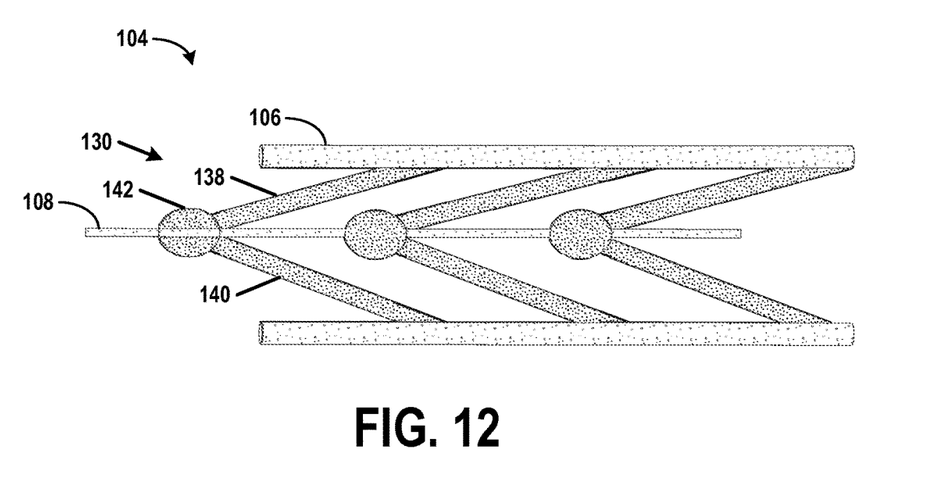
FIG. 12 illustrates a side view of the elastomeric apparatus with the rod in the disengaged position, according to another example embodiment.

FIGS. 11 and 12 illustrate example side views of the elastomeric apparatus 104 including the components in the form of the struts 130, 132, 134, and 136. FIG. 11 illustrates the rod 108 in the engaged position such that the struts 130, 132, 134, and 136 are expanded to provide the rigid surface state of the housing 106. The struts include pairs of upper struts coupled to lower struts, such as upper strut 138 and lower strut 140 for the strut 130 that are coupled to a hinge component 142. The upper strut 138 is mounted to the rod 108 via the hinge component 142, and is coupled to an upper wall 144 of the housing 106, and the lower strut is 140 is mounted to the rod 108 via the hinge component 142, and is coupled to a lower wall 146 of the housing 106.

In the engaged position of the rod 108, the struts 130, 132, 134, and 136 are expanded, as shown in FIG. 11. In the expanded position, for example, the upper strut 138 and lower strut 140 may not be fully vertically aligned at 180°, and may allow for an alignment through an angle of about 150°. Further, as shown in FIG. 11, the struts 130, 132, 134, and 136 may be mounted to the rod 108 and spaced apart along a length of the rod 108.

FIG. 12 illustrates an example side view of the elastomeric apparatus 104 including the components in the form of the struts 130, 132, 134, and 136, and the rod 108 is in the disengaged position such that the struts 130, 132, 134, and 136 are collapsed to provide the flexible surface state of the housing 106.

Figure 13:
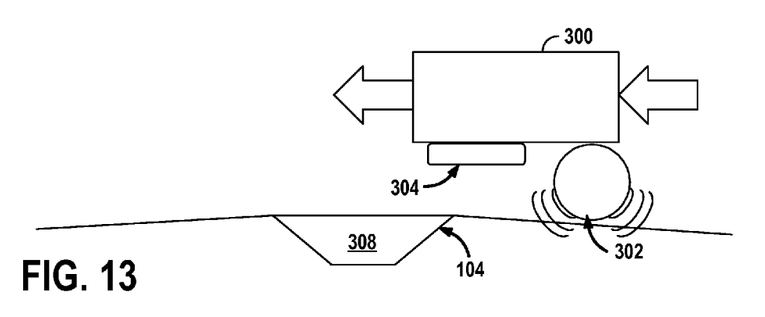
FIG. 13 illustrates the example method for altering the surface rigidity state of the elastomeric apparatus in which elastomeric apparatus is in a compliant or flexible state, according to an example embodiment.
Figure 14:
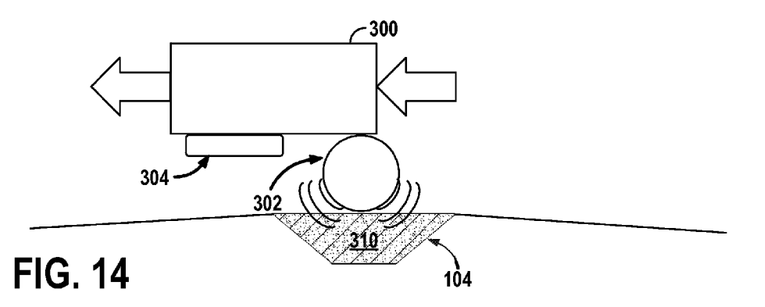
FIG. 14 illustrates the example method for altering the surface rigidity state of the elastomeric apparatus in which elastomeric apparatus is in a rigid state, according to an example embodiment.
Figure 15:
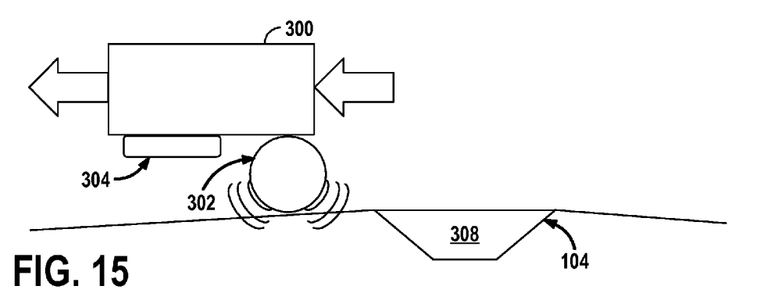
FIG. 15 illustrates the example method for altering the surface rigidity state of the elastomeric apparatus in which elastomeric apparatus returns to the flexible state, according to an example embodiment.

FIGS. 13-15 illustrate the example method for altering the surface rigidity state of the elastomeric apparatus during automated lamination. In FIG. 13, the elastomeric apparatus 104 is in a compliant state 308 or flexible state. An AFP machine head 300 that includes an AFP roller 302 and an IR heater 304 for application of the fibers moves across the mandrel (not shown) with the elastomeric apparatus 104 inserted. As the AFP machine head 300 travels across the elastomeric apparatus 104, the components (not shown in FIGS. 13-15) in the elastomeric apparatus 104 are actuated to alter the surface rigidity state of the tooling mandrel. For example, FIG. 14 illustrates the elastomeric apparatus 104 in a rigid state 310. The components temporarily align into position as the AFP machine head 300 rolls over and then the components can be actuated to relax again to return the elastomeric apparatus 104 to the compliant state 308, as shown in FIG. 15.

As shown in FIGS. 13-15, the rigid state of the elastomeric apparatus 104 is supportive of surface compaction applied by the AFP machine head 300. During AFP fiber placement, the AFP roller 302 rolls over the elastomeric apparatus 104 and applies forces that may slightly deform the elastomeric apparatus. Using methods described herein though, the internal components can provide support to resist the force of the AFP roller 302. Examples forces applied by the AFP roller 302 may be about 100 PSI, or between about 0-200 PSI, during material application. Thus, the components 110 may provide structure to the housing 106 to resist such forces.

Thus, within examples as shown in FIGS. 13-15, the elastomeric apparatus 104 may be configured into the compliant state 308 initially, and then a lamination device (e.g., AFP machine head 300) may pass by the elastomeric apparatus 104 causing the elastomeric apparatus 104 to transition to the rigid state 310.

Another configuration may be used as well, such that the elastomeric apparatus 104 is placed into the rigid state 310 during an entire lamination process, such as during operation of the AFP machine head 300 for application of multiply plies and multiple passes of the lamination device because a compliant elastomeric apparatus 104 may allow the material to relax and wrinkle. Thus, in this configuration, the elastomeric apparatus 104 may be activated not by the presence of the lamination device (AFP machine head 300), but by another applied external mechanical force, for example.

Figure 16:
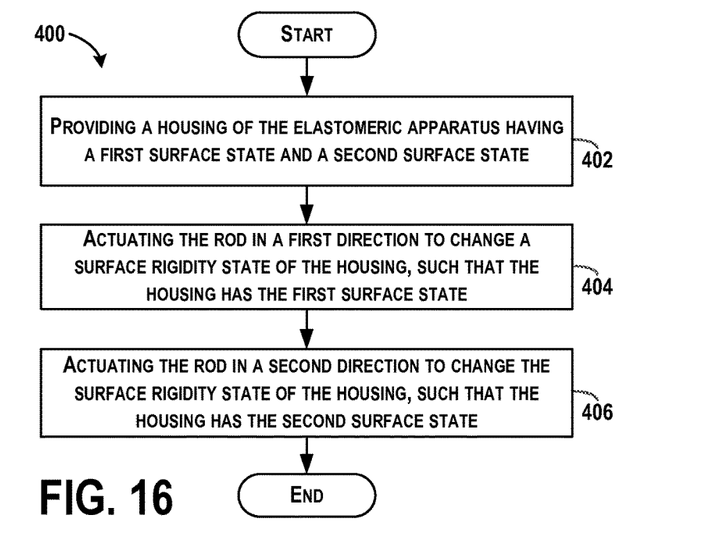
FIG. 16 shows a flowchart of an example method for altering a surface rigidity of an elastomeric apparatus, according to an example embodiment.

FIG. 16 shows a flowchart of an example method 400 for altering a surface rigidity of an elastomeric apparatus, according to an example embodiment. Method 400 shown in FIG. 16 presents an embodiment of a method that, for example, could be used by the system shown in FIG. 1, for example, and may be performed by components of the system in FIG. 1. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 400 may include one or more operations, functions, or actions as illustrated by one or more of blocks 402-406. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present embodiments. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

At block 402, the method 400 includes providing the housing 106 of the elastomeric apparatus 104 having a first surface state and a second surface state, and the housing 106 has a rod 108 within the housing 106 extending along a length of the housing 106 and a plurality of components 110 mounted to the rod 108. At block 404, the method 400 includes actuating the rod 108 in a first direction to change a surface rigidity state of the housing 106, such that the housing 106 has the first surface state. At block 406, the method 400 includes actuating the rod 108 in a second direction to change the surface rigidity state of the housing 106, such that the housing 106 has the second surface state.

In some examples, the first surface state is a rigid surface state, and the second surface state is a flexible surface state. In other examples, the first surface state is a flexible surface state, and the second surface state is a rigid surface state. Additionally, actuation of the rod 108 may include actuating the rod 108 through a rotational actuation as shown in FIG. 6, or through a linear actuation as shown in FIGS. 3-5.

Figure 17:
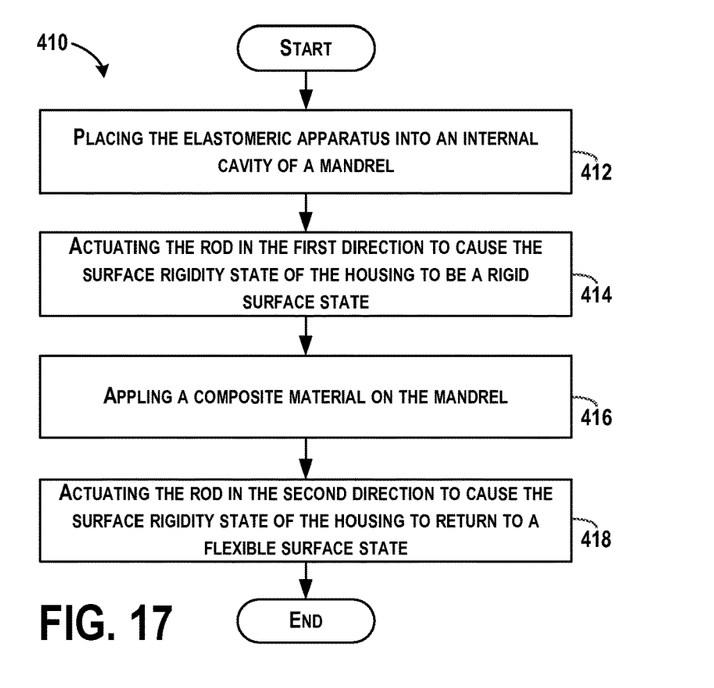
FIG. 17 shows a flowchart of another example method for altering a surface rigidity of an elastomeric apparatus, according to an example embodiment.

FIG. 17 shows a flowchart of another example method 410 for altering a surface rigidity of an elastomeric apparatus, according to an example embodiment. The method 410 may be performed in combination with the method 400 shown in FIG. 14, for example.

At block 412, the method 410 includes placing the elastomeric apparatus 104 into an internal cavity of a mandrel 100. At block 414, the method 410 includes actuating the rod 108 in the first direction to cause the surface rigidity state of the housing 106 to be a rigid surface state. At block 416, the method 410 includes applying a composite material on the mandrel 100. At block 418, the method 410 includes actuating the rod 108 in the second direction to cause the surface rigidity state of the housing 106 to return to a flexible surface state.

Within examples, the rod 108 is actuated to cause the surface rigidity state of the housing 106 to be rigid during application of fiber placement so as to cause the elastomeric apparatus 104 to react to a force of a lamination application device (e.g., the AFP machine head 300). Further, after the application of fiber placement, the rod 108 is actuated to cause the surface rigidity state of the housing 106 to return to the flexible surface state. The elastomeric apparatus 104 may then be flexible and can be extracted from inside of the mandrel 100 after cure.

Actuation of the rod 108 may occur in many ways. As one example, the rod 108 may extend out of the elastomeric apparatus 104 and can be manually actuated to slide back and forth. The rod 108 can be pushed into the elastomeric apparatus 104 to cause the surface rigidity to be rigid, and pulled out of the elastomeric apparatus to cause the surface rigidity to be flexible. When the elastomeric apparatus 104 is installed into the mandrel 100, the rod 108 may be positioned into the engaged position, for example.

Thus, within the examples described herein, the internal components 110 can be moved by the rod 108 (either through a linear or rotational movement), such that when the rod 108 is actuated from a first position to a second position, the components 110 cause the housing 106 to be a rigid state, and when the rod 108 is actuated to return to the first position, the components 110 allow the housing 106 to be a flexible state.

Figure 18:
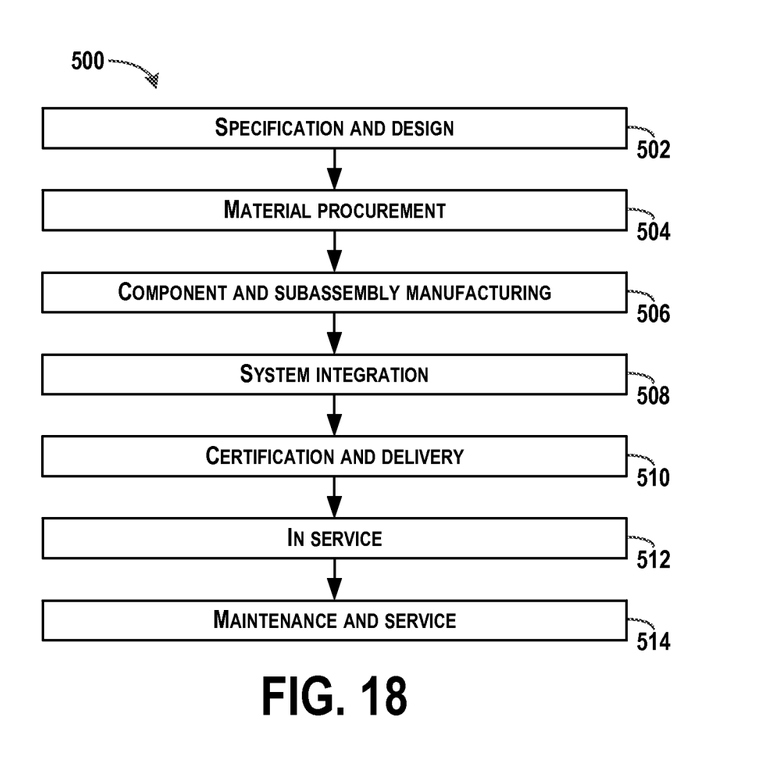
FIG. 18 shows a flowchart of an example aircraft manufacturing and service method, according to an example embodiment.
Figure 19:
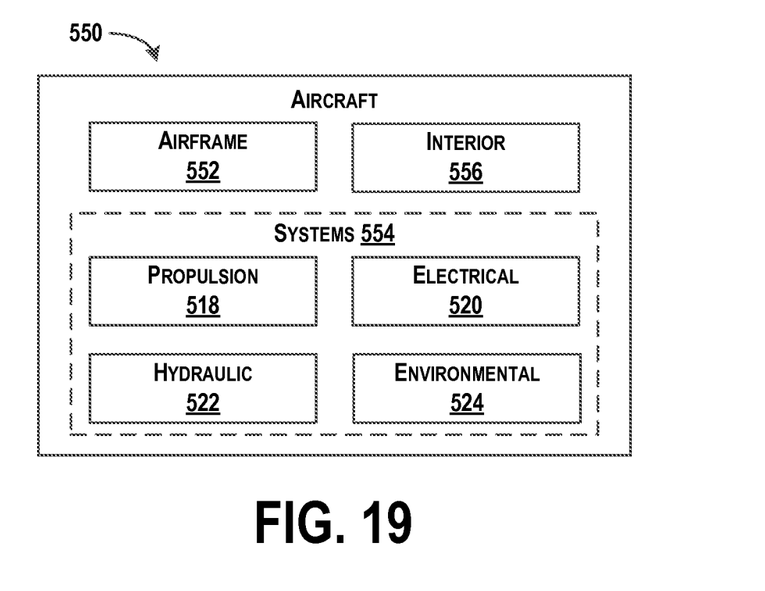
FIG. 19 shows a block diagram of an aircraft, according to an example embodiment.

Embodiments of the disclosure may find use in a variety of potential applications, particularly in the transportation industry, including for example, aerospace, marine, automotive applications and other application where autoclave curing of composite parts may be used. Therefore, referring now to FIGS. 18 and 19, embodiments of the disclosure may be used in the context of an aircraft manufacturing and service method 500 as shown in FIG. 18 and an aircraft 550 as shown in FIG. 19. Aircraft applications of the disclosed embodiments may include, for example, without limitation, curing of stiffener members such as, without limitation beams, spars and stringers, to name only a few. During pre-production, exemplary method 500 may include specification and design 502 of the aircraft 550 and material procurement 504. During production, component and subassembly manufacturing 506 and system integration 508 of the aircraft 550 takes place. Thereafter, the aircraft 550 may go through certification and delivery 510 in order to be placed in service 512. While in service by a customer, the aircraft 550 is scheduled for routine maintenance and service 514, which may also include modification, reconfiguration, refurbishment, and so on.

Each of the processes of method 500 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 19, the aircraft 550 produced by exemplary method 500 may include an airframe 552 with a plurality of systems 554 and an interior 556. Examples of high-level systems 554 include one or more of a propulsion system 518, an electrical system 520, a hydraulic system 522, and an environmental system 524. Any number of other systems may be included. Although an aerospace example is shown, the principles of the disclosure may be applied to other industries, such as the marine and automotive industries.

Systems and methods embodied herein may be employed during any one or more of the stages of the production and service method 500. For example, components or subassemblies corresponding to production process 502 may be fabricated or manufactured in a manner similar to components or subassemblies produced while the aircraft 550 is in service. Also, one or more apparatus embodiments, method embodiments, or a combination thereof may be utilized during the production stages 502 and 504, for example, by substantially expediting assembly of or reducing the cost of an aircraft 550. Similarly, one or more of apparatus embodiments, method embodiments, or a combination thereof may be utilized while the aircraft 500 is in service, for example and without limitation, to maintenance and service 510.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to explain the principles of the embodiments, the practical application, and to enable others of ordinary skill in the art to understand the disclosure for various embodiments with various modifications as are suited to the particular use contemplated.

What is claimed is:

1. An elastomeric apparatus for use in manufacture of a composite component, comprising:
   an elastomer housing having a flexible surface state and a rigid surface state;
   a plurality of pairs of surface components provided on opposing internal surfaces of the elastomer housing, wherein a pair of surface components comprises a first surface component provided on a first internal surface of the elastomer housing and a second surface component provided on a second internal surface of the elastomer housing that is opposite the first internal surface;
   a rod within the elastomer housing extending along a length of the elastomer housing; and
   a plurality of components mounted to the rod, such that in an engaged position of the rod the plurality of components cause the elastomer housing to have the rigid surface state by the plurality of components being aligned with respective pairs of the plurality of pairs of surface components, and wherein in a disengaged position of the rod the plurality of components enable the elastomer housing to have the flexible surface state.

2. The elastomeric apparatus of claim 1, wherein the rod is configured to transition between the engaged position and the disengaged position through a rotational actuation.

3. The elastomeric apparatus of claim 1, wherein the rod is configured to transition between the engaged position and the disengaged position through a linear actuation.

4. The elastomeric apparatus of claim 1, wherein the rod extends along a center of the elastomer housing and couples to walls of the elastomer housing via one or more links.

5. The elastomeric apparatus of claim 1, wherein the plurality of components are mounted to the rod spaced apart along a length of the rod.

6. The elastomeric apparatus of claim 1, wherein the plurality of components comprise an upper component for contact with the first surface component provided on the first internal surface of the elastomer housing and a lower component for contact with the second surface component provided on the second internal surface of the elastomer housing, based on the rod being in the engaged position.

7. The elastomeric apparatus of claim 1, further comprising:
   a plurality of spaces between the plurality of pairs of surface components, and
   wherein in a disengaged position of the rod the plurality of components are aligned with respective spaces of the plurality of spaces to cause the housing to have the flexible surface state.

8. The elastomeric apparatus of claim 1, wherein the rod is configured to transition between the engaged position and the disengaged position through a bi-directional linear actuation causing the plurality of components to be aligned with respective pairs of the plurality of pairs of surface components through actuation in a first direction and to be aligned with respective spaces of the plurality of spaces through actuation in a second direction.

9. An elastomeric apparatus for use in manufacture of a composite component, comprising:
   an elastomer housing having a flexible surface state and a rigid surface state;
   a plurality of pairs of surface components provided on opposing internal surfaces of the elastomer housing, wherein a pair of surface components comprises a first surface component provided on a first internal surface of the elastomer housing and a second surface component provided on a second internal surface of the elastomer housing that opposite from the first internal surface;
   a plurality of spaces between the plurality of pairs of surface components;
   a rod within the elastomer housing extending along a length of the elastomer housing; and
   a plurality of components mounted to the rod, such that in an engaged position of the rod the plurality of components are aligned with respective pairs of the plurality of pairs of surface components to cause the elastomer housing to have the rigid surface state, and wherein in a disengaged position of the rod the plurality of components are aligned with respective spaces of the plurality of spaces to cause the elastomer housing to have the flexible surface state.

10. A method for altering a surface rigidity of an elastomeric apparatus, comprising:
    providing an elastomer housing of the elastomeric apparatus having a first surface state and a second surface state, wherein the elastomer housing has a rod within the elastomer housing extending along a length of the elastomer housing and a plurality of components mounted to the rod, and wherein the elastomer housing has a plurality of pairs of surface components provided on opposing internal surfaces of the elastomer housing, wherein a pair of surface components comprises a first surface component provided on a first internal surface of the elastomer housing and a second surface component provided on a second internal surface of the elastomer housing that is opposite the first internal surface;

actuating the rod in a first direction to change a surface rigidity state of the elastomer housing, such that the elastomer housing has the first surface state due to the plurality of components being aligned with respective pairs of the plurality of pairs of surface components; and actuating the rod in a second direction to change the surface rigidity state of the elastomer housing, such that the elastomer housing has the second surface state.

11. The method of claim 10, wherein the first surface state is a rigid surface state, and the second surface state is a flexible surface state.

12. The method of claim 10, wherein actuating the rod comprises actuating the rod through a rotational actuation.

13. The method of claim 10, wherein actuating the rod comprises actuating the rod through a linear actuation.

14. The method of claim 10, further comprising:
placing the elastomeric apparatus into an internal cavity of a mandrel;
actuating the rod in the first direction to cause the surface rigidity state of the elastomer housing to be a rigid surface state;
applying a composite material on the mandrel; and
actuating the rod in the second direction to cause the surface rigidity state of the elastomer housing to return to a flexible surface state.

* * * * *